United States Patent
Okamoto et al.

(10) Patent No.: US 6,246,440 B1
(45) Date of Patent: Jun. 12, 2001

(54) CIRCUIT FOR GENERATING A REFERENCE SIGNAL

(75) Inventors: Naoki Okamoto, Osaka; Norihide Kinugasa, Kyoto, both of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/309,855

(22) Filed: May 11, 1999

(30) Foreign Application Priority Data

May 14, 1998 (JP) .................................................. 10-131730

(51) Int. Cl.[7] .................................................. H04N 9/44
(52) U.S. Cl. ............................................ 348/505; 348/549
(58) Field of Search ........................................ 348/505, 194, 348/520, 506, 507, 524, 536, 549, 545, 542, 557, 540, 544; 331/20; H04N 9/44, 9/45

(56) References Cited

U.S. PATENT DOCUMENTS

| | | | |
|---|---|---|---|
| 4,860,290 | * 8/1989 | Murata et al. | 348/549 |
| 5,351,091 | * 9/1994 | Hosoya et al. | 348/505 |
| 5,896,180 | * 4/1999 | Usui | 348/505 |

FOREIGN PATENT DOCUMENTS

| | | |
|---|---|---|
| 57-84695 | 5/1982 | (JP) . |
| 58-117702 | 7/1983 | (JP) . |
| 63-82084 | 4/1988 | (JP) . |

* cited by examiner

*Primary Examiner*—Victor R. Kostak
(74) *Attorney, Agent, or Firm*—Merchant & Gould P.C.

(57) ABSTRACT

A compact, inexpensive circuit for generating several stable reference signals from several burst signals is provided. The circuit comprises a first oscillator using a quartz oscillator; a second oscillator with a variable oscillation frequency having a range broader than that of the first voltage-controlled oscillator; a first frequency divider for dividing a frequency of an output signal of the first oscillator by j; a second frequency divider for dividing a frequency of an output signal of the second oscillator by k; a first phase comparator for comparing a phase of an output signal of the first frequency divider with a phase of an output signal of the second frequency divider; a first lowpass filter for smoothing an output signal of the first phase comparator and returning the smoothed signal as feedback to a control terminal of the second oscillator; a second phase comparator for comparing a phase of an output signal of the second oscillator with a phase of the burst signal; and a second lowpass filter for smoothing an output signal of the second phase comparator and returning the smoothed signal as feedback to a control terminal of the first oscillator. The continuous reference signal with the desired frequency is obtained from the output signal of the second oscillator.

15 Claims, 8 Drawing Sheets

CIRCUIT FOR GENERATING A REFERENCE SIGNAL

BACKGROUND OF THE INVENTION

1. Field of the Invention

The present invention relates to a circuit for generating a reference signal synchronized with an input burst signal. In particular, the present invention relates to a circuit for generating various reference signals of different frequencies that are adapted to different television systems, that is, different reference subcarriers for chrominance demodulation.

2. Description of the Prior Art

There are currently three well-known television systems, namely NTSC, PAL and SECAM, and especially NTSC and PAL are widely used around the world. Moreover, in addition to PAL, there are the PAL-N and the PAL-M formats. The frequencies of the reference subcarriers used for NTSC, PAL-N, PAL-M and PAL are 3.579545 MHz, 3.582056 MHz, 3.575611 MHz and 4.433619 MHz, respectively.

Conventional circuits for generating reference carriers often use automatic phase control (APC) with a phase-locked loop (PLL), as shown in FIG. 8.

In FIG. 8, a voltage-controlled oscillator (VCXO) 1 outputs an oscillation signal with the stabilized frequency $f_{ref}$ that is substantially determined by the resonance frequency (for example 3.58 MHz) of an external quartz oscillator 2. For simplicity, the oscillation signal with the frequency $f_{ref}$ is sometimes referred to as the "oscillation signal $f_{ref}$" in the following. The same is true for other signals as well, where sometimes the frequency is used as the name of the signal, especially when there is no need to distinguish between the two.

A burst gate circuit 3 extracts a burst signal $f_{SC}$ from an input chrominance signal $C_{in}$. The oscillation signal $f_{ref}$ and the burst signal $f_{SC}$ are provided as input to a phase comparator 4a of an APC circuit 4, whose output is a phase comparison signal $\Delta f_{SC}$. After the phase comparison signal $\Delta f_{SC}$ is smoothed with a low-pass filter (LPF) 4b, it is returned as a feedback signal to the control terminal of the voltage-controlled oscillator 1.

The voltage-controlled oscillator 1 is controlled by this voltage feedback signal. As a result, the oscillation signal $f_{ref}$ of the voltage-controlled oscillator 1 is controlled in a manner that $f_{ref}$ has the same frequency and the same phase as the burst signal $f_{SC}$. Thus, the continuous oscillation signal $f_{ref}$, which has the same stability as the burst signal $f_{ref}$ can be used as the reference subcarrier signal $f_{ref}$.

Since such an APC-type circuit for generating a reference carrier uses neither coils nor capacitors, it has not only mechanical stability but also stability toward temperature changes, and is suitable for integrated circuits. When a quartz is used, the free-running frequency of the oscillation signal of such a circuit for generating a reference carrier shows only small variations, and the range over which the frequency can be varied with the voltage control terminal is about ±500 Hz. Thus, a continuous oscillation signal with the same frequency and the same phase as the burst signal can be obtained instantly, when the chrominance signal is input.

However, because of the previously mentioned small variable frequency range, one separate quartz oscillator has to be provided for each frequency to generate several reference carriers with different frequencies.

On the other hand, if a voltage-controlled oscillator with a broad variable range (for example an RC oscillator) is used for generating several reference carriers with different frequencies, the time from free running until an oscillation signal with the same frequency and the same phase as the burst signal can be obtained—that is, until the APC locks—is long. Moreover, so-called "side-locking" can occur, where a frequency near the targeted oscillation frequency, but one line frequency away, is locked.

In order to avoid side-locking, variations in the oscillation frequency have to be suppressed and the variable frequency range has to be narrowed, but then it becomes difficult to generate several reference carriers with different frequencies. Moreover, it is difficult to include RC oscillators on integrated circuits, because in ICs, the variations in the resistance R and the capacitance C are large.

To generate a plurality of reference carriers with different frequencies adapted to a plurality of television systems as described above, Publication of Examined Japanese Patent Application No. Sho 63-28521 discloses the use of several different external quartz oscillators, one for each frequency, which can be switched accordingly.

Furthermore, when the passband of the lowpass filter 4b in the APC circuit using the PLL is narrow, the time until synchronization is long, resulting in deterioration of stability. Publication of Unexamined Japanese Patent Application No. Sho 63-82084 discloses a configuration for increasing the precision of the oscillation frequency while increasing the stability by widening the passband of the lowpass filter. This conventional example uses one quartz oscillator each for two voltage-controlled oscillator circuits, and increases the stability of the oscillation frequency by using a dual loop PLL.

However, in these conventional technologies the circuits become rather complicated, resulting in the problem of increasing size and costs. Thus, it has been desired strongly to solve those problem, particularly in a field of appliances where the demand for lower costs and miniaturization is high.

SUMMARY OF THE INVENTION

The present invention has been developed in consideration of these shortcomings of the prior art. It is an object of the present invention to provide a comparatively simple, compact and inexpensive circuit for generating a plurality of stable reference signals from a plurality of burst signals with different frequencies, selectively.

A circuit of a first configuration according to the present invention includes, as main elements, a first and a second voltage-controlled oscillators having a control terminal, respectively, with oscillation frequencies being variable in response to signals supplied to the control terminals. In addition to the main elements, the circuit further includes: a first frequency divider for dividing a frequency of an output signal of the first voltage-controlled oscillator by j; a second frequency divider for dividing a frequency of an output signal of the second voltage-controlled oscillator by k; a first phase comparator for comparing a phase of an output signal of the first frequency divider with a phase of an output signal of the second frequency divider; a first lowpass filter for smoothing an output signal of the first phase comparator and supplying the smoothed signal to a control terminal of the second voltage-controlled oscillator so as to form a feedback control path; a second phase comparator for comparing a phase of an output signal of the second voltage-controlled oscillator with a phase of the burst signal; and a second lowpass filter for smoothing an output signal of the second phase comparator and supplying the smoothed signal to a control terminal of the first voltage-controlled oscillator so as to form a feedback control path. The reference signal is obtained from the output signal of the second voltage-controlled oscillator.

It is preferable that the first configuration of the circuit further comprises means for activating the feedback from the second phase comparator to the first voltage-controlled oscillator only when the burst signal is active, and means for activating the feedback from the first phase comparator to the second voltage-controlled oscillator only when the burst signal is not active. This stabilizes the control of the two feedback loops.

It is preferable that the feedback from the first phase comparator to the second voltage-controlled oscillator is only active for a predetermined period, and a duty ratio which is a ratio of the predetermined period to the other period is variable. Thereby the predetermined time can be long enough (i.e. the duty ratio is high) until the PLL locks and the variable frequency range of the voltage-controlled oscillator can be widened, so that the desired frequency can be reached quickly; and if the predetermined time is then reduced once the desired frequency is reached, frequency variations can be suppressed.

It is preferable that the first configuration of the circuit further comprises a burst gate circuit for extracting the burst signal from a chrominance signal. A control signal supplied to this burst gate circuit can be the same as a control signal supplied to the means for activating the feedback from the second phase comparator to the first voltage-controlled oscillator only when the burst signal is active.

It is preferable that the first configuration of the circuit further comprises a frequency multiplier a frequency multiplier for multiplying by $\alpha$ a frequency of the output signal of the first voltage-controlled oscillator; and a third frequency divider for dividing by a $\alpha$ frequency of the output signal of the second voltage-controlled oscillator. The output signal of the first voltage-controlled oscillator passes through the frequency multiplier before being input into the first frequency divider; and the output signal of the second voltage-controlled oscillator passes through the third frequency divider before being input into the second phase comparator and output as the reference signal. Using such a frequency multiplier, a general-purpose, inexpensive quartz oscillator with relatively low frequency can be used.

To give a specific numerical example for the first configuration, it is preferable that the value of $\alpha$ is 4; a center oscillation frequency of said first voltage-controlled oscillator is approximately 4.43 MHz. The divisors j and k for the first and the second frequency dividers are set in the following manner: When a frequency of the input burst signal is 3.575611 MHz, the divisors j and k are set to 186 and 150, respectively. When a frequency of the input burst signal is 3.579545 MHz, the divisors j and k are set to 218 and 176, respectively. When a frequency of the input burst signal is 3.582056 MHz, the divisors j and k are set to 177 and 143, respectively. The output signal of the first voltage-controlled oscillator is directly input into the second phase comparator, when a frequency of the input burst signal is 4.433619 MHz,.

If no frequency multiplier for multiplying the frequency of the output signal of the first voltage-controlled oscillator is used, it is preferable that the center oscillation frequency of the first voltage-controlled oscillator is approximately 17.7 MHz; and the divisors j and k for the first and the second frequency dividers are set in the following manner: When a frequency of the input burst signal is 3.575611 MHz, the divisors j and k are set to 186 and 150, respectively. When a frequency of the input burst signal is 3.579545 MHz, the divisors j and k are set to 218 and 176, respectively. When a frequency of the input burst signal is 3.582056 MHz, the divisors j and k are set to 177 and 143, respectively. When a 4.433619 MHz burst signal is input, both divisors j and k are set to 200.

A circuit of a second configuration according to the present invention includes, as main elements, a first voltage-controlled oscillator using a quartz oscillator and a second voltage-controlled oscillator having a control terminal, with a oscillation frequency being variable in response to a signal supplied to the control terminal. The circuit further includes: a phase comparator for comparing a phase of an output signal of the second voltage-controlled oscillator with a phase of the burst signal; a lowpass filter for smoothing an output signal of the phase comparator and returning the smoothed signal as feedback to a control terminal of the second voltage-controlled oscillator; a first counter for timing a first time span corresponding to m times a period of an output signal of the first voltage-controlled oscillator; a second counter for timing a second time span corresponding to n times a period of the output signal of the second voltage-controlled oscillator; a third counter for timing a third time span corresponding to p times a period of the output signal of the second voltage-controlled oscillator, the third time span being set to be longer than the second time span; and a control means for applying a voltage to a control terminal of the second voltage-controlled oscillator. The control means applies the voltage so as to cause the effects in the following manner: That is, an oscillation frequency of the second voltage-controlled oscillator is decreased if the second time span and the third time span are both shorter than the first time span. The oscillation frequency of the second voltage-controlled oscillator is increased if the second time span and the third time span are both longer than the first time span. The oscillation frequency of the second voltage-controlled oscillator is maintained if the first time span falls between the second time span and the third time span. The reference signal is obtained from the output signal of the second voltage-controlled oscillator. As in the first configuration, this second configuration employs a stable quartz oscillator with a narrow variable frequency range (first voltage-controlled oscillator) and the second voltage-controlled oscillator with a comparatively broad variable frequency range. This configuration can handle several burst signals of different frequency, because it further comprises a digital control using counters.

It is preferable that the first counter outputs a first signal when finished timing m times the period of the output signal of the first voltage-controlled oscillator; the second counter outputs a second signal when finished counting n pulses in the output signal of the second voltage-controlled oscillator; the third counter outputs a third signal when finished counting p pulses in the output signal of the second voltage-controlled oscillator. The value p is larger than n. The second counter and the third counter are reset by a signal that is obtained by slightly delaying the first signal. The control means can include (i) a first latch and a second latch for latching the second signal and the third signal, respectively, in response to the first signal, and (ii) a decoder for obtaining a signal by decoding the output signals from the first latch and the second latch, and superimposing the decoded signal on the input signal to the low pass filter.

It is preferable that the second configuration of the circuit further comprises means for activating the feedback from the phase comparator to the second voltage-controlled oscillator only when the burst signal is active.

It is preferable that the second configuration of the circuit further comprises a burst gate circuit for extracting the burst signal from a chrominance signal.

It is preferable that the second configuration of the circuit further comprises a frequency divider for dividing by α a frequency of the output signal of the second voltage-controlled oscillator. Thus, the output signal of the second voltage-controlled oscillator passes through the frequency divider before being input into the phase comparator and output as the reference signal. According to such an embodiment, the frequency $f_{CW}$ of the reference signal becomes $f_{CW}=f_A/\alpha$ ($f_A$ is the frequency of the output of the second voltage-controlled oscillator). The numbers m, n, and p satisfy an equation $$n/f_A < m/f_{ref} < p/f_A.$$

Modifying the equation gives $$(1/\alpha)(n/m)f_{ref} < f_{CW} < (1/\alpha)(p/m)f_{ref}.$$

In this equation, the frequency change when n and p are changed by 1 becomes $f_{ref}/\alpha m$. Consequently, if α is large, the frequency change can be made small.

To give a specific numerical example for the second configuration, it is preferable that the value of α is 4; a center oscillation frequency of the first voltage-controlled oscillator is approximately 4.43 MHz; the value of m is 2048; and the count factors n and p for the second and the third counters are set in the following manner: When a frequency of the input burst signal is 3.575611 MHz, the count factors n and p are set to 6610 and 6603, respectively. When a frequency of the input burst signal is 3.579545 MHz, the count factors n and p are set to 6617 and 6610, respectively. When a frequency of the input burst signal is 3.582056 MHz, the count factors n and p are set to 6622 and 6616, respectively. The output signal of the first voltage-controlled oscillator is directly input into the second phase comparator, when a frequency of the input burst signal is 4.433619 MHz.

DESCRIPTION OF THE PREFERRED EMBODIMENTS

The following is a description of the preferred embodiments of the present invention, with reference to the accompanying drawings.

First Embodiment

Figure 1:
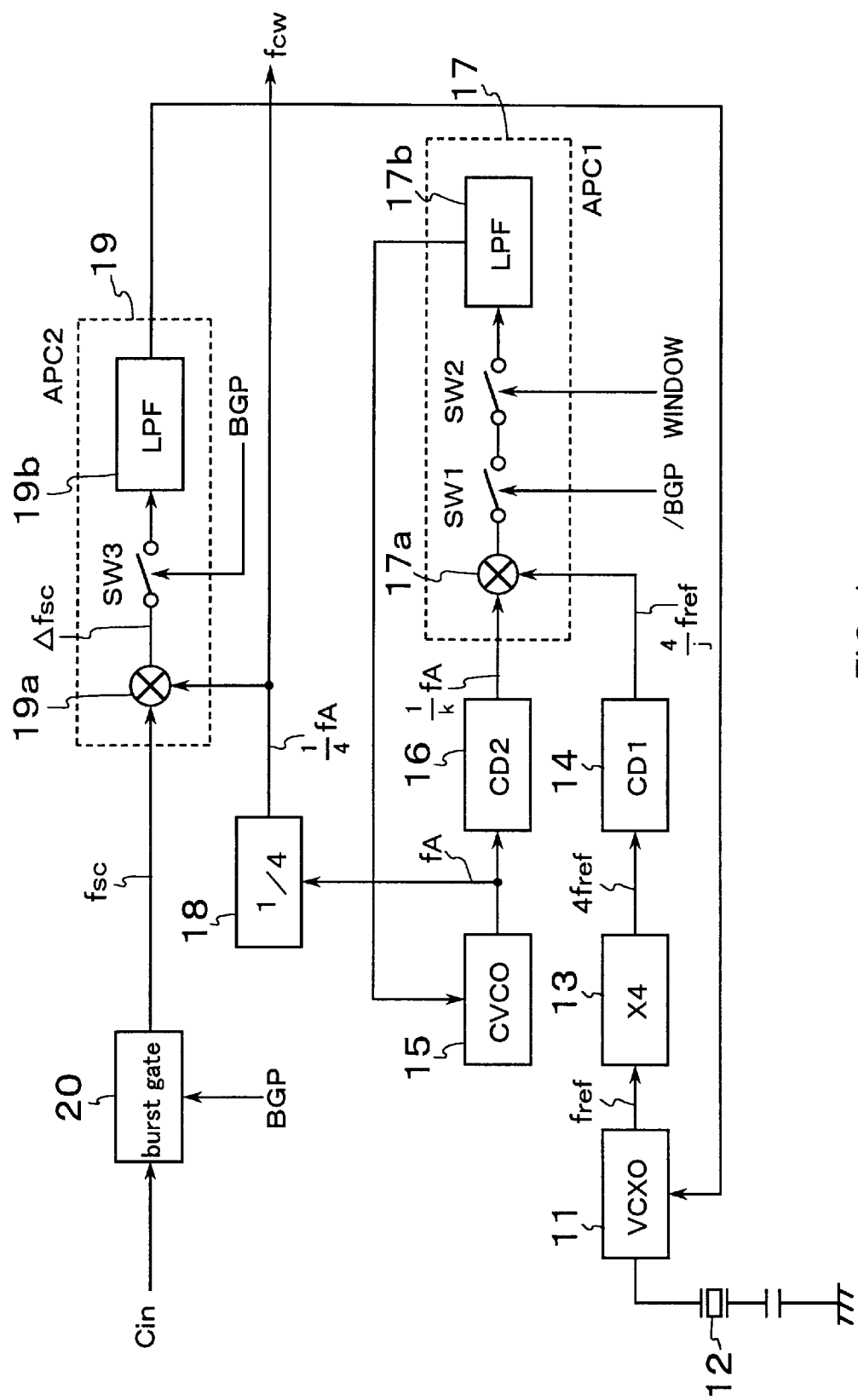
FIG. 1 is a block diagram of a circuit for generating a reference carrier signal in accordance with a first embodiment of the present invention.

FIG. 1 shows a block diagram of a circuit for generating a reference carrier in accordance with the present invention.

In FIG. 1, a voltage-controlled oscillator (VCXO) 11 outputs an oscillation signal $f_{ref}$ with a stabilized frequency that is substantially determined by the resonance frequency of an external quartz oscillator 12. Usually, a 4.433619 MHz quartz oscillator is appropriate.

After the frequency of the oscillation signal $f_{ref}$ has been multiplied by 4 with a frequency multiplier 13, it is divided by j with a first frequency divider (CD1) 14. Consequently, the frequency of the signal that is output by the first frequency divider is $4f_{ref}/j$.

The circuit for generating a reference carrier of this embodiment further comprises a second voltage-controlled oscillator (CVCO) 15, in addition to the first voltage-controlled oscillator (VCXO) 11. This oscillator 15 is a voltage-controlled RC oscillator with a broad variable frequency range, which does not use a quartz oscillator, and for example can be a multivibrator. The output $f_A$ of the oscillator 15 is divided by k with a second frequency divider (CD2) 16. Consequently, the frequency of the signal given out by the second frequency divider 16 is $f_A/k$.

The output signal $f_{ref}/j$ given out by the first frequency divider 14 and the output signal $f_A/k$ given out by the second frequency divider are fed into a first phase comparator 17a, which is part of a first APC circuit 17. The phase comparator 17a compares the phases of the two signals and outputs a phase comparison signal. After passing a first switch SW1 and a second switched SW2 explained below, this phase comparison signal is smoothed by a lowpass filter (LPF) 17b, before it is returned as feedback to the control terminal of the second voltage-controlled oscillator 15.

The second voltage-controlled oscillator 15 is controlled by this feedback signal voltage. As a result, the oscillation signal $f_A$ of the second voltage-controlled oscillator 15 is adjusted in a manner that the two signals $4f_{ref}/j$ and $f_A/k$ that are fed into the first phase comparator 17a have the same frequency and the same phase. That is, the relationship between the frequencies becomes $$4f_{ref}/j=f_A/k \qquad (1)$$

and assuming that j=k yields $$4f_{ref}=f_A. \qquad (2)$$

Thus, it can be seen that a signal $f_A$ that has four times the frequency of $f_{ref}$ can be obtained as the oscillation frequency output by the second voltage-controlled oscillator 15. Adjusting the values for j and k, an oscillation signal with the desired frequency can be obtained from the second voltage-controlled oscillator 15. This will be explained in more detail further below.

After the frequency of the output signal $f_A$ of the second voltage-controlled oscillator 15 is divided by four with a third frequency divider 18, it is output as the reference signal $f_{CW}$ ($=f_A/4$), as is shown in FIG. 1. This signal $f_A/4$ is furthermore fed into a second phase comparator 19a, which is part of a second APC circuit 19.

Also fed into the second phase comparator 19a is a burst signal $f_{SC}$, which is extracted from an input chrominance signal $C_{in}$ with a burst gate circuit 20. The phase comparator 19a compares the phases of the two signals $f_A/4$ and $f_{SC}$, and outputs a phase comparison signal $\Delta f_{SC}$. This phase comparison signal $\Delta f_{SC}$ passes a third switch SW3, which is explained further below, and is smoothed by a second lowpass filter (LPF) 19b, before it is returned as feedback to the control terminal of the first voltage-controlled oscillator 11.

If there is a phase shift between the burst signal $f_{SC}$ and the signal $f_A/4$, the phase comparator 19a outputs the signal $\Delta f_{SC}$, which corresponds to this phase shift. The signal $\Delta f_{SC}$ is smoothed with the lowpass filter 19b, and is fed back as the control voltage to the control terminal of the first voltage-controlled oscillator 11, so that the oscillation signal $f_{ref}$ is corrected first. As a result, the oscillation signal $f_A$ of the second voltage-controlled oscillator 15 is corrected with the first APC circuit 17. Thus, using such a double-feedback circuit comprising a first APC circuit 17 and a second APC circuit 19, a signal $f_A/4$, which has been adjusted to the same frequency and phase as the burst signal $f_{SC}$, can be obtained as the reference subcarrier signal $f_{CW}$.

Figure 2:
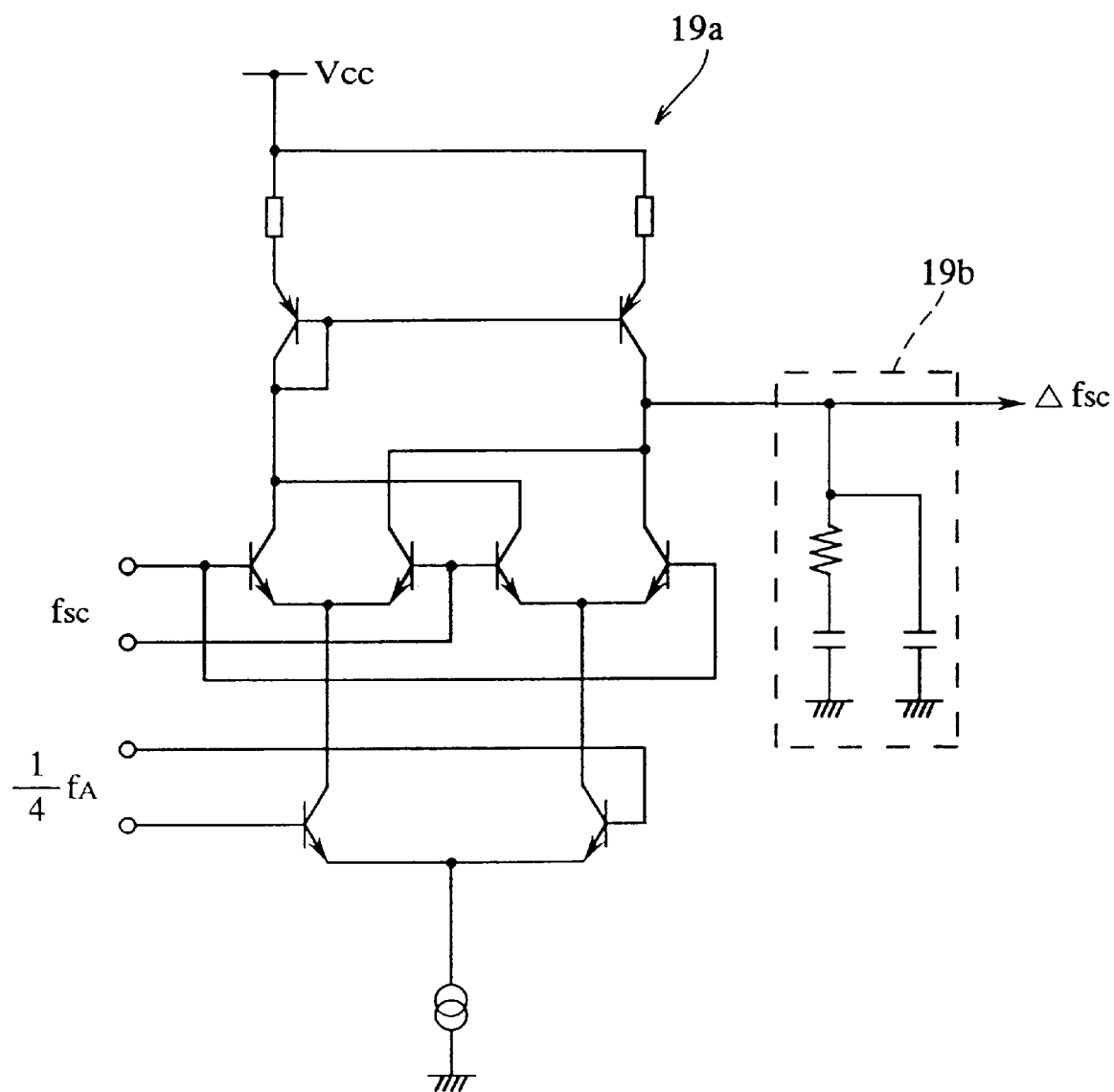
FIG. 2 is a specific circuit diagram of the APC circuit for the circuit of FIG. 1.

FIG. 2 shows a specific example for an APC circuit. This example shows the second APC circuit 19, but the same configuration also can be applied to the first APC circuit 17. Although the specific circuit details for the switch SW3 have been omitted from this drawing, it can easily be composed by inserting a switching circuit with, for example, a transistor between the phase comparator 19a and the lowpass filter 19b.

The phase comparator 19a includes a double-balanced differential amplifier, which outputs a signal that corresponds to the product of the burst signal $f_{SC}$ and the signal $f_A/4$. When this signal is smoothed by a low pass filter 19b, a voltage signal relatively positive or negative corresponding to the phase difference between the burst signal $f_{SC}$ and the signal $f_A/4$ is obtained. If the phase difference is zero, this voltage signal is also zero.

Figure 3:
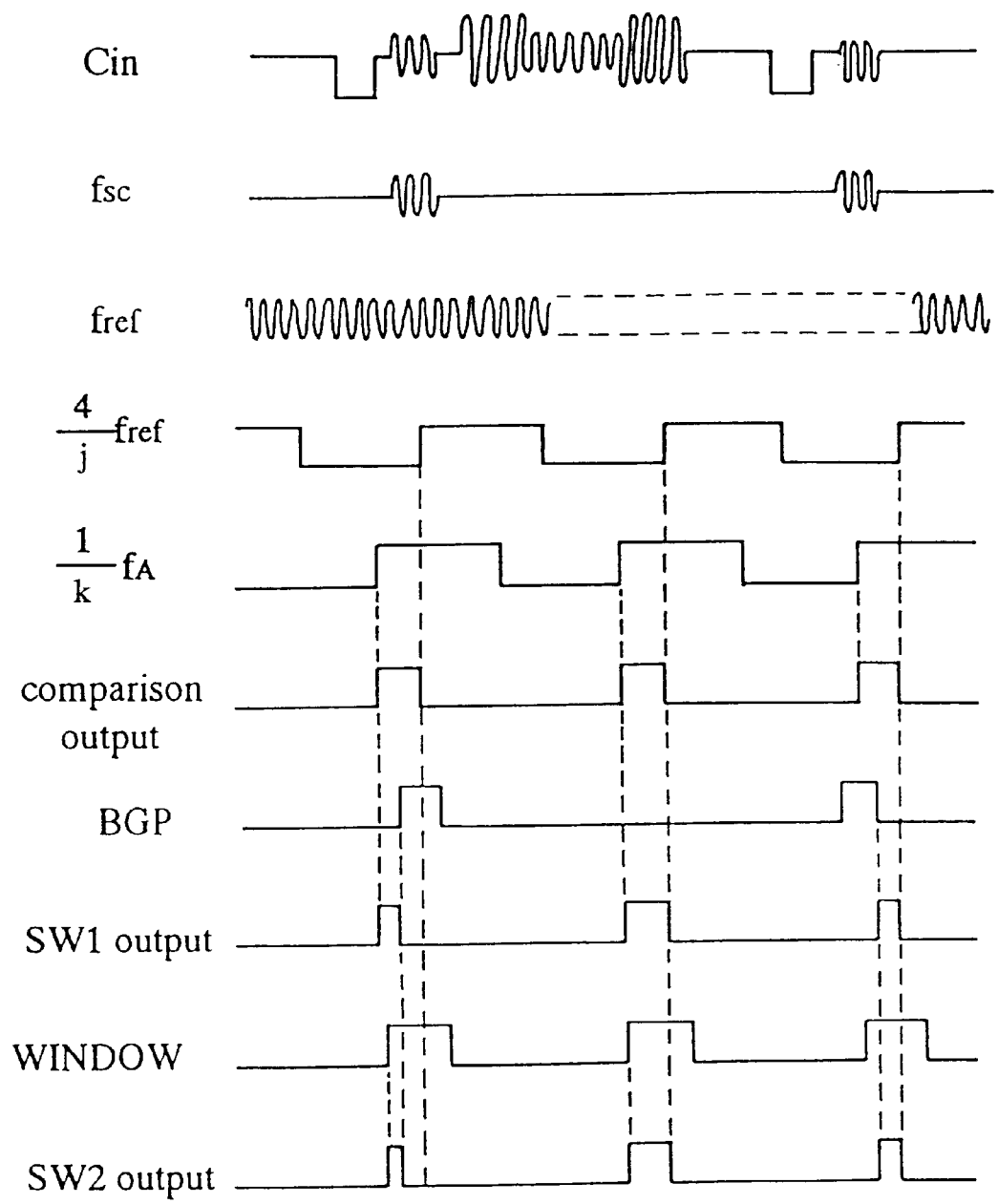
FIG. 3 illustrates waveforms of signals in the circuit of FIG. 1.

The following is a more detailed explanation of the operation of the circuit for generating a reference carrier in accordance with this embodiment, with reference to the waveforms of signals in FIGS. 1 and 2 illustrated in FIG. 3.

FIG. 3 schematically shows signal waveforms, taking the horizontal axis as the time axis. The uppermost waveform $C_{in}$ is an example of an input chrominance signal. The second waveform $f_{SC}$ is the burst signal that is extracted from the chrominance signal $C_{in}$ with the burst gate circuit 20. The next waveform $f_{ref}$ is the output signal of the first voltage-controlled oscillator 11. The next waveform $4f_{ref}/j$ shows the signal, after the frequency of the signal $f_{ref}$ has been multiplied by 4 with the frequency multiplier 13 and divided by j with the frequency divider 14. The output signal $f_{ref}$ is a sine wave, but the signal is formed into a rectangular wave when it passes the frequency multiplier 13 and the frequency divider 14. The next waveform $f_A/k$ shows the signal, after the frequency of the output signal $f_A$ of the second voltage-controlled oscillator 15 has been divided by k with the second frequency divider 16. In FIG. 3, the phase of the signal $f_A/k$ leads the phase of the signal $4f_{ref}/j$ by about 60°.

The signal that is obtained from the phase comparator 17a by comparing the two signals $f_A/k$ and $4f_{ref}/j$, that is, the comparison output, is shown as the next waveform. This comparison output is a outflow pulse having the width of the phase difference.

The next waveform BGP is the burst gate pulse. This signal is applied as a control signal to the burst gate circuit 20 and the switch SW3 of the second APC circuit 19. Moreover, its inverse signal (/BGP) is used for controlling the first switch SW1 of the first APC circuit 17. Thus, the feedback loop including the second APC circuit 19 is activated only when the burst gate pulse BGP is high (that is, when the burst signal is active), whereas the feedback loop including the first APC circuit 17 is activated only when the burst gate pulse BGP is low (that is, when the burst signal is not active). Thus, the signal output of SW1 is the logical product of the preceding comparison output and the inverse BGP signal, as shown in FIG. 3.

A WINDOW signal is shown below the SW1 output signal. This signal is used for controlling the second switch SW2 in the first APC circuit 17, which is connected in series to the first switch SW1. This activates the feedback loop including the first APC circuit 17 only when the WINDOW signal is high. Thus, the output signal of SW2 is the logical product of the preceding SW1 output signal and the WINDOW signal, as is shown in FIG. 3. By changing the time of high level of the WINDOW signal (i.e. the duty ratio), the loop gain can be changed. For example, if the duty ratio is set to 1/2, thus setting the loop gain comparatively high, until the PLL locks, the variable frequency range of the second voltage-controlled oscillator 15 is widened and the desired frequency can be reached quickly; and if the duty ratio is then reduced to 1/4 once the desired frequency is reached, the loop gain can be made comparatively small, so that frequency variations are suppressed.

The WINDOW signal should be synchronized with the output signal $4f_{ref}/j$ of the frequency divider 14, but different from it in phase and pulse width. The WINDOW signal can be obtained from the output of the frequency divider 14 in the process of making the signal $4f_{ref}/j$. That is, for that purpose, it is only needed to change the position of extracting the output signal from the frequency divider 14.

The following is a specific explanation of how a plurality of burst signals $f_{SC}$ with different frequencies can be handled with a circuit for generating a reference carrier signal in accordance with the first embodiment of the invention. As explained above, the circuit for generating a reference carrier signal of this embodiment can deal with several burst signal frequencies $f_{SC}$ by setting the divisors j and k of the first and the second frequency dividers 14 and 16 to appropriate values.

The PLL including the first APC circuit 17 lets the condition $4f_{ref}/j=f_A/k$ as expressed by the equation (1) be satisfied. The reference carrier signal $f_{CW}$ is equal to $f_A/4$, and is controlled to be equal to the burst signal $f_{SC}$, so that combining the equation (1) with $f_A/4=f_{SC}$ yields an equation (3).

$$f_{ref}=(j/k)f_{SC} \tag{3}$$

Based on this equation, the values for j and k can be determined for a set of specific burst signal frequencies so that the required variation of the output frequency $f_{ref}$ of the first voltage-controlled oscillator circuit 11 is as small as possible within the variable output frequency range (about ±500 Hz) of the first voltage-controlled oscillator circuit 11. Table 1 lists examples of the values for j and k adjusted to four television systems, namely PAL-M, NTSC, PAL-N and PAL with the frequencies 3.575611 MHz, 3.579545 MHz, 3.582056 MHz, and 4.433619 MHz.

TABLE 1

| $f_{SC}$ (MHz) | j | k | $f_{ref}$ (MHz) | $f_{ref}$-4.433619 (Hz) |
| --- | --- | --- | --- | --- |
| 3.575611 | 186 | 150 | 4.433758 | 139 |
| 3.579545 | 218 | 176 | 4.433755 | 136 |
| 3.582056 | 177 | 143 | 4.433734 | 115 |
| 4.433619 | 200 | 200 | 4.433619 | 0 |

Thus, by choosing appropriate values for j and k, several different reference carrier signals $f_{CW}$ adapted to burst signals with different frequencies can be obtained. And, when a 4.433619 MHz burst signal is input, the output signal $f_{ref}$ of the first voltage-controlled oscillator 11 can be fed directly into the second phase comparator 19a. In this case, the second voltage-controlled oscillator 15 and the first APC circuit 17 do not operate.

In the circuit in FIG. 1, the multiplication factor for the frequency multiplier 13 is not limited to "4", and similarly, the dividing ratio for the third frequency divider 18 is not limited to "1/4". Generally speaking, when the multiplication factor for the frequency multiplier 13 is $\alpha$ and the dividing ratio for the third frequency divider 18 is $\beta$, the output frequency of the frequency multiplier 13 is $\alpha \cdot f_{ref}$ and the output frequency of the frequency divider 18 is $\beta \cdot f_A$. Consequently, the equation (1) can be replaced by an equation (4).

$$\alpha \cdot f_{ref}/j = f_A/k \quad (4)$$

Since $\beta \cdot f_A = f_{SC}$, the equation (4) yields an equation (5).

$$f_{ref} = (1/\alpha\beta)(j/k)f_{SC} \quad (5)$$

If $\alpha$ is equal to $1/\beta$ in the equation (5) (in FIG. 1 both are 4), the equation (5) is equivalent to the equation (3).

The oscillation frequency $f_A$ of the second voltage-controlled oscillator 15 is expressed by $f_A = (\alpha/j) f_{ref} k$ according to the equation (4). Therefore, the second voltage-controlled oscillator 15 should have a variable frequency range which covers frequencies determined by the combination of the values j, k and $\alpha$ in relation with the oscillation frequency $f_A$ of the first voltage-controlled oscillator 11. Further the variable range should be determined so that the frequency requirement is satisfied even under the worst condition in consideration of fluctuation of temperature or power source and characteristic dispersion of circuit elements.

The frequency multiplier 13 and the third frequency divider 18 are used so that a general-purpose, inexpensive quartz oscillator 12 with relatively low frequency can be used. If a quartz oscillator with a resonance frequency that is $\alpha$ times the frequency of the burst signal is used, the frequency multiplier 13 is not necessary.

Second Embodiment

Figure 4:
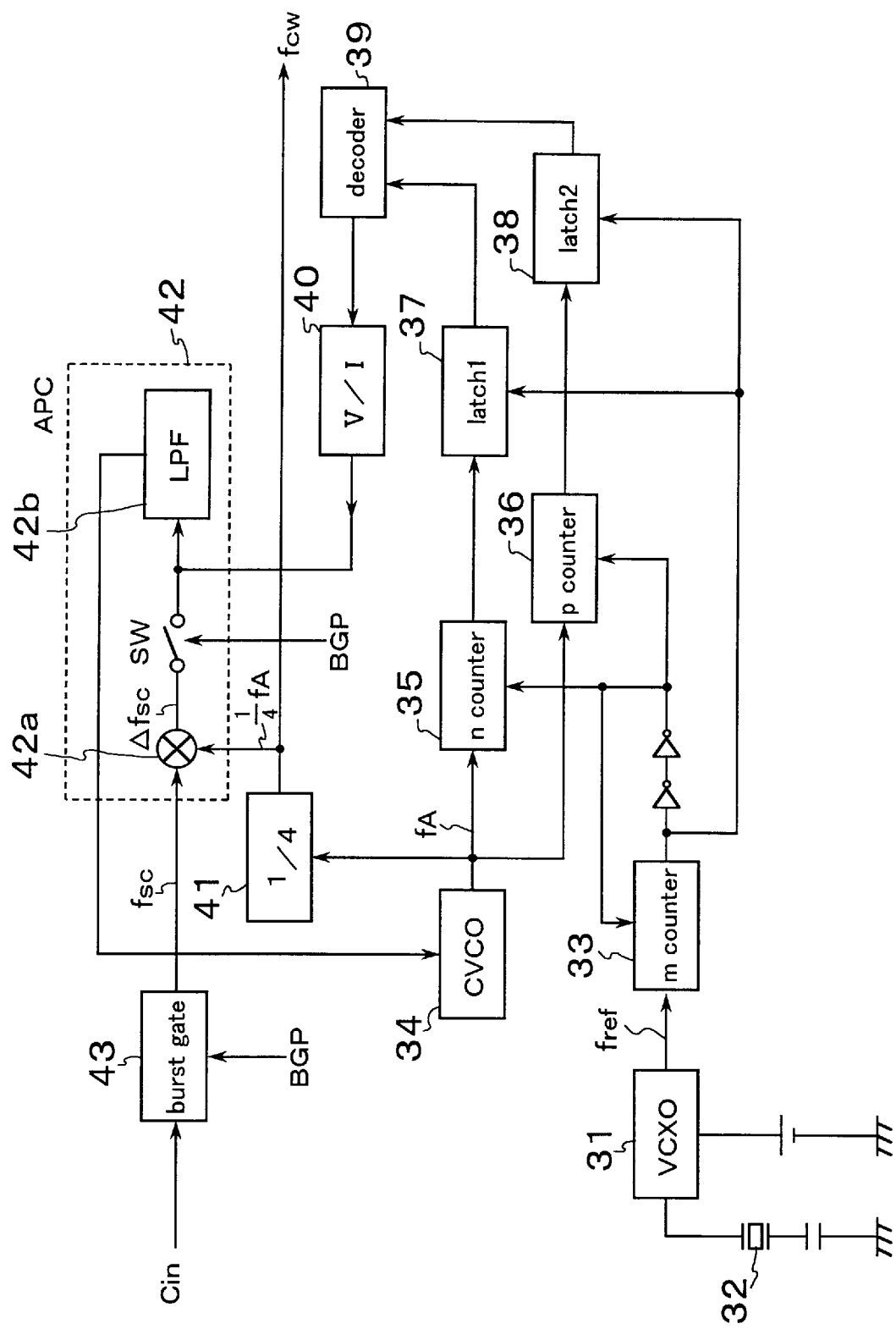
FIG. 4 is a block diagram of a circuit for generating a reference carrier in accordance with a second embodiment of the present invention.

FIG. 4 is a block diagram showing a circuit for generating a reference carrier signal in accordance with a second embodiment of the present invention. In FIG. 4, a first voltage-controlled oscillator (VCXO) 31 outputs an oscillation signal $f_{ref}$ with a stabilized frequency that is substantially determined by the resonance frequency of an external quartz oscillator 32. Usually, a 4.433619 MHz quartz oscillator is appropriate. The oscillation frequency $f_{ref}$ that is output by the first voltage-controlled oscillator 31 is fed into a first counter 33. This counter 33 counts the periods of the oscillation signal $f_{ref}$ up to m, and then outputs a first signal. In other words, when a first time span equivalent to $m/f_{ref}$ has elapsed after starting to count, the counter output is inverted from low to high.

In addition to the first voltage-controlled oscillator (VCXO) 31, a second voltage-controlled oscillator (CVCO) 34 is provided. This oscillator 34 is a voltage-controlled RC oscillator with a broad variable frequency range, which does not use a quartz oscillator, and for example can be a multivibrator. The output $f_A$ of the oscillator 34 is fed into a second counter 35 and a third counter 36. The second counter 35 counts the periods of the second oscillation signal $f_A$ up to n, and then outputs a second signal. Thus, when a second time span equivalent to $n/f_A$ has elapsed after starting the count, the counter output is inverted from low to high. The third counter 36 counts the periods of the second oscillation signal $f_A$ up to p, and then outputs a third pulse signal. Thus, when a third time span equivalent to $p/f_A$ has elapsed after starting the count, the counter output is inverted from low to high. Here, p is set to a higher value than n.

The second counter 35 and the third counter 36 are reset by a signal that is obtained by slightly delaying the first signal from the first counter 33. Consequently, if the second time span $n/f_A$ and the third time span $p/f_A$ are longer than the first time span $m/f_{ref}$, neither a second signal nor a third signal are output (the counter output is not inverted). If the first time span $m/f_{ref}$ falls between the second time span $n/f_A$ and the third time span $p/f_A$, the second pulse signal is output, but no third pulse signal is output. If the second time span $n/f_A$ and the third time span $p/f_A$ are shorter than the first time span $m/f_{ref}$, both the second signal and the third signal are output.

The second pulse from the second counter 35 is latched by a first latch 37, and the third pulse from the third counter 36 is latched by a second latch 38. As the latch timing signal, the latches 37 and 38 are supplied with the first signal from the first counter 33. As a result, the output signals of the counters 35 and 36 are supplied to the latches 37 and 38 and stored thereby, before they are reset by the slightly delayed first signal. The delay can be obtained through, for example, inverting period of two gate circuits.

Consequently, by feedback-controlling the voltage applied to the control terminal of the second voltage-controlled oscillator 34 according to the output signals of the latches 37 and 38, the output signal $f_A$ of the second voltage-controlled oscillator 34 can be adjusted in a manner that the first time span $m/f_{ref}$ falls between the second time span $n/f_A$ and the third time span $p f_A$. Such a control is operated by a decoder 39 and a current/voltage converter (V/I) 40, whose function is explained in more detail below.

The output signal $f_A$ of the second voltage-controlled oscillator 34 is output as the reference signal $f_{CW}$ (=$f_A/4$), after its frequency has been divided by four with a frequency divider 41. This signal $f_A/4$ is also fed into a phase comparator 42a of an APC circuit 42.

Also fed into the phase comparator 42a is a burst signal $f_{SC}$, which is extracted from an input chrominance signal $C_{in}$ with a burst gate circuit 43. The phase comparator 42a compares the phases of the two signals $f_A/4$ and $f_{SC}$, and outputs a phase comparison signal $\Delta f_{SC}$. This signal $\Delta f_{SC}$ passes a switch SW, and is smoothed by a lowpass filter (LPF) 42b, before it is returned as feedback to the control terminal of the second voltage-controlled oscillator 34. Thus, the second voltage-controlled oscillator 34 can be controlled with a PLL in a manner that the phase of the signal $f_A/4$, which is equivalent to the reference subcarrier signal $f_{CW}$, become substantially the same as the phase of the burst signal $f_{SC}$.

Since the decoder 39 and the voltage/current converter 40 are included in the above-mentioned feedback loop, a part of the APC circuit 42 also serves as a part of the feedback loop that controls the second voltage-controlled oscillator 34 in a manner that the first time span $m/f_{ref}$ (timed by the first counter) falls between the second time span $n/f_A$ (timed by the second counter) and the third time span $p/f_A$ (timed by the third counter). As can be seen in FIG. 4, the output signal of the decoder 39 is fed into the current/voltage converter 40, whose output signal is superimposed with the input signal for the lowpass filter of the APC circuit 42.

Figure 5:
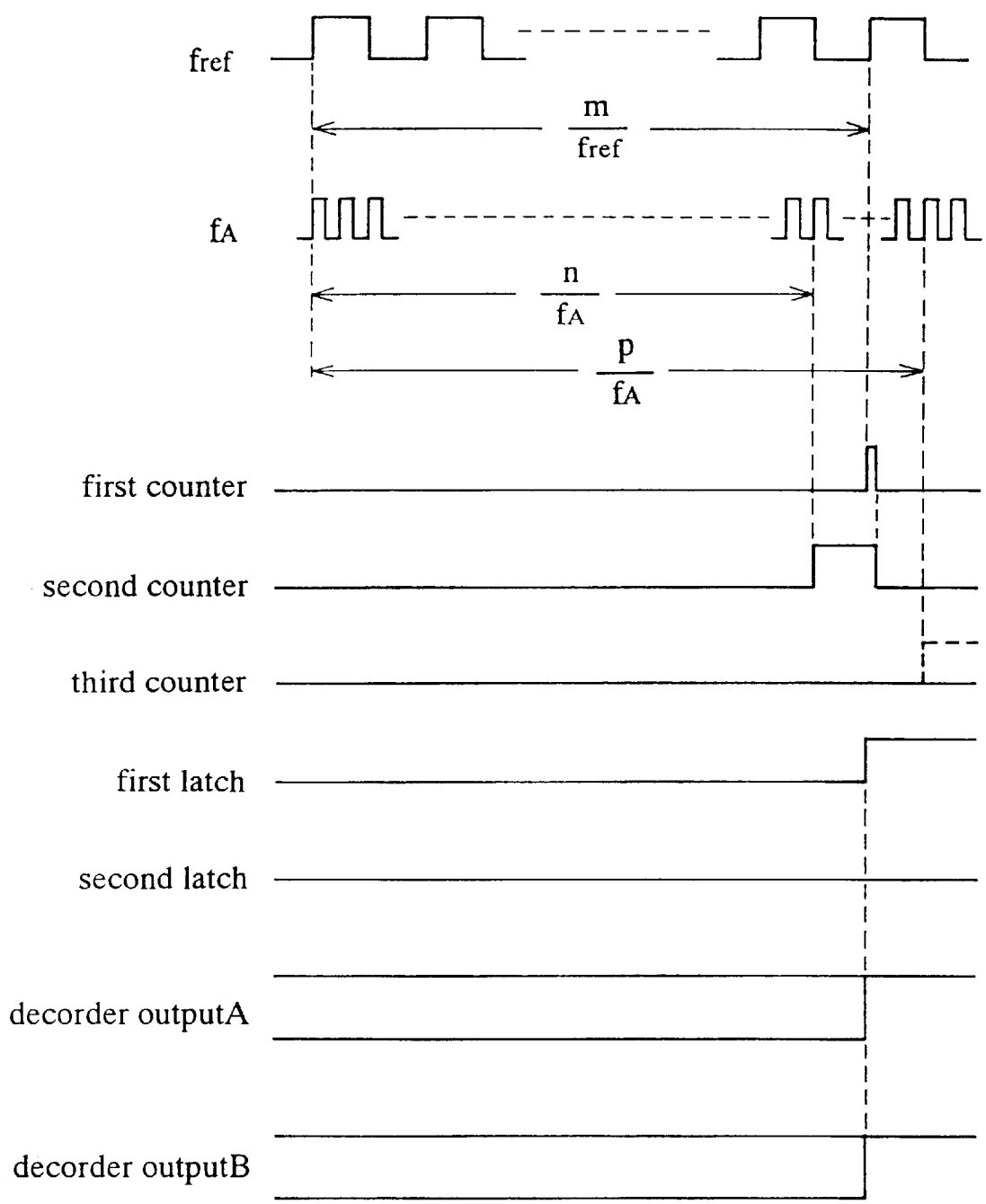
FIG. 5 illustrates waveforms of signals in the circuit of FIG. 4.

FIG. 5 shows examples of the oscillation signals $f_{ref}$ and $f_A$ of the first and the second voltage-controlled oscillator 31 and 34. FIG. 5 further shows the output signals from the first, second and third counters 33, 35, and 36. Also FIG. 5 shows the output signals from the first and second latches 37 and 38, and output signals A and B of the decoder 39. FIG. 5 illustrates the situation where the first time span $m/f_{ref}$ falls between the second time span $n/f_A$ and the third time span $p/f_A$.

As can be seen from FIG. 5, when the second time span $n/f_A$ has passed, the output of the second counter turns from low to high. When the first time span $m/f_{ref}$ has passed, the output of the first counter turns high. At this time, the output signal of the second counter is latched by the first latch. A little after that, the second counter is reset together with the first counter. A broken line of the output signal of the third counter in FIG. 5 illustrates a point in time when the output of the third counter would reverse from low to high after counting all the way to p, that is, when the third time span $p/f_A$ has elapsed. But in reality, since the third counter is reset before that, at the same time that the first and the second counter are reset, the output of the third counter does not reverse and stays low. Consequently, the output of the second latch also stays low.

If the frequency $f_A$ is higher than the desired frequency, so that the third time span $p/f_A$ elapses before the first time span $m/f_{ref}$, then the outputs of both the second and the third counters reverse, and both latches turn high. Conversely, if the frequency $f_A$ is lower than the desired frequency, so that the second time span $n/f_A$ elapses after the first time span $m/f_{ref}$, then the outputs of both the second and the third counters stay low, and both latches will be low.

Based on the output of the first and the second latch, the voltage/current converter (V/I) 40 receives the two decoder outputs A and B from the decoder 39, shown in Table 2.

TABLE 2

| first latch | H | H | L |
| second latch | H | L | L |
| decoder output A | H | H | L |
| decoder output B | L | H | H |

Figure 6:
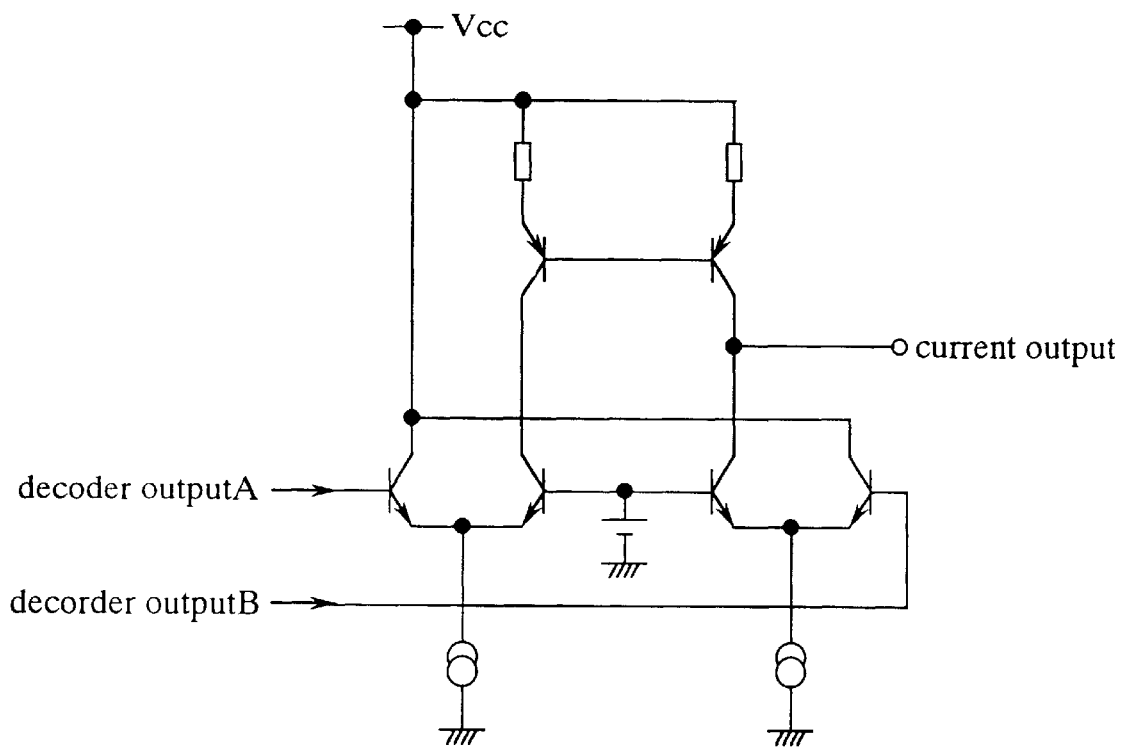
FIG. 6 is a specific circuit diagram of the voltage/current converter for the circuit of FIG. 4.

The voltage/current converter 40 can be a circuit as illustrated in FIG. 6.
Table 3 shows its current output for different decoder outputs A and B.

TABLE 3

| decoder output A | H | H | L |
| decoder output B | L | H | H |
| current output | inflow | zero | outflow |

In Table 3, "inflow" current output means a current that causes an effect of reducing the frequency $f_A$, and "outflow" current output means a current that causes an effect of increasing the frequency $f_A$.

In the example of FIG. 5, the output of the first latch is high, and the output of the second latch is low, so that the decoder outputs A and B are both high. In this case, the frequency $f_A$ is within an acceptable range, and the output of the voltage/current converter 40 is zero. If the frequency $f_A$ is higher than the upper frequency limit, the outputs of both latches are high, so that the decoder output A turns high and decoder output B turns low. Thus the output current of the voltage/current decoder 40 becomes inflow, which lowers the frequency $f_A$. Conversely, if the frequency $f_A$ is lower than the lower frequency limit, the outputs of both latches are low, and since the decoder output A turns low and decoder output B turns high, the output current of the voltage/current decoder 40 becomes outflow which raises the frequency $f_A$.

By selecting appropriate values for the count factor m of the first counter 33, the count factor n of the second counter 35, and the count factor p of the third counter 36, the frequency $f_A$ can be kept within a desired range. For example, if the values for m, n, and p are set as shown in Table 4, suitable frequency ranges $f_{OSC1}$ to $f_{OSC2}$ (MHz) within which the frequency $f_A/4$ should be kept are obtained, with each of three different burst frequencies $f_{SC}$ (MHz) being positioned near the center of the corresponding frequency ranges for each $f_{OSC1}$ to $f_{OSC2}$. The frequency $f_{OSC1}$ is determined by the values of m and p, with the output frequency $f_{ref}$ of the first voltage-controlled oscillator 31 being 4.433619 MHz. The frequency $f_{OSC2}$ is determined by the values of m and n.

TABLE 4

| $f_{SC}$ | m | n | p | $f_{OSC1}$ | $f_{OSC2}$ |
|---|---|---|---|---|---|
| 3.575611 | 2048 | 6610 | 6603 | 3.573631 | 3.577420 |
| 3.579545 | 2048 | 6617 | 6610 | 3.577420 | 3.581208 |
| 3.582056 | 2048 | 6622 | 6616 | 3.580667 | 3.583914 |

The second voltage-controlled oscillator 34 is controlled so that $f_A/4$ falls within the frequency range between $f_{OSC1}$ and $f_{OSC2}$, and the APC circuit matches the frequency and phase of the signal $f_A/4$ to the burst signal. Thus $f_A/4$ is corrected so as to be appropriate for the reference subcarrier signal $f_{CW}$.

Figure 7:
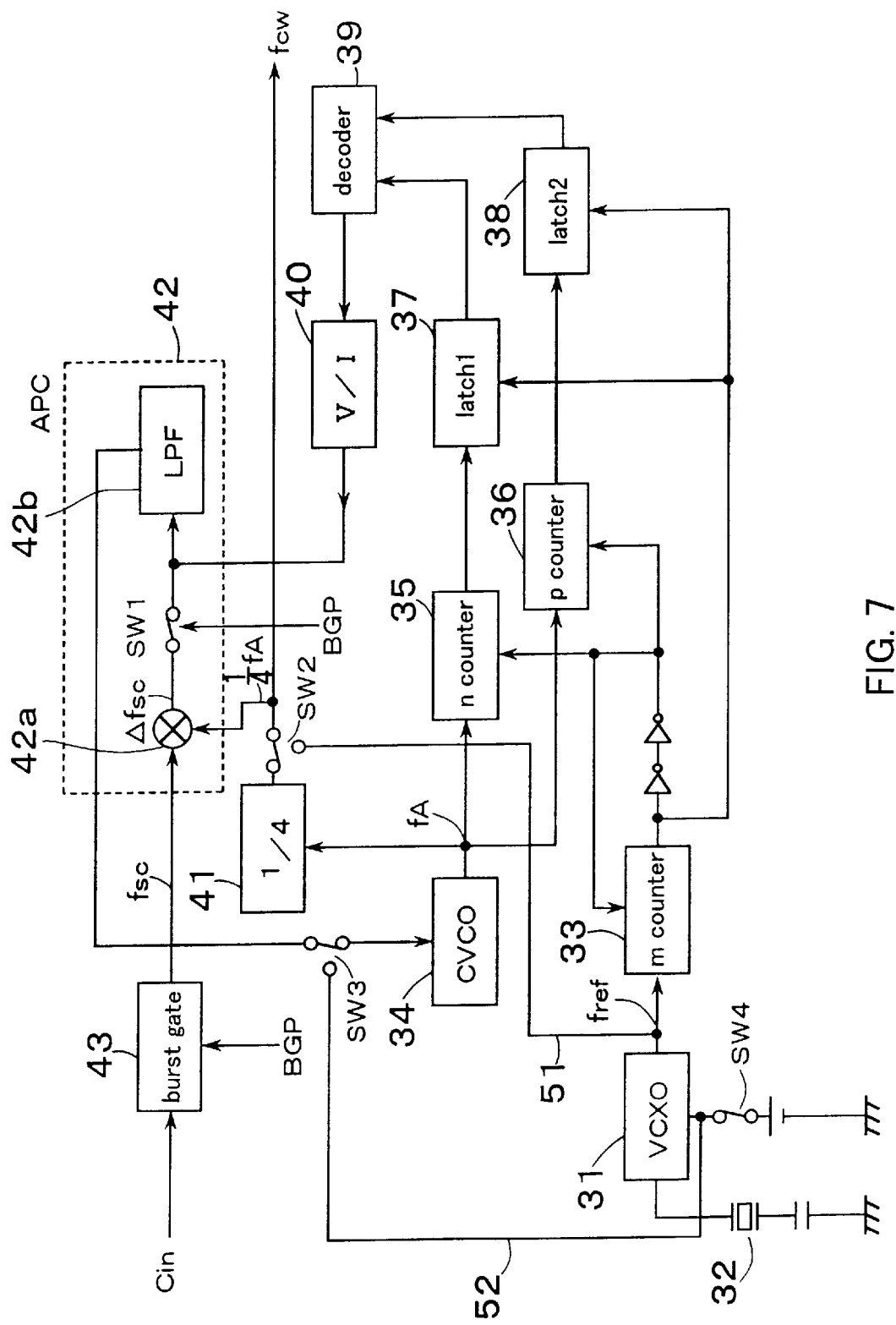
FIG. 7 is a block diagram showing a modified example of the circuit in FIG. 4.
Figure 8:
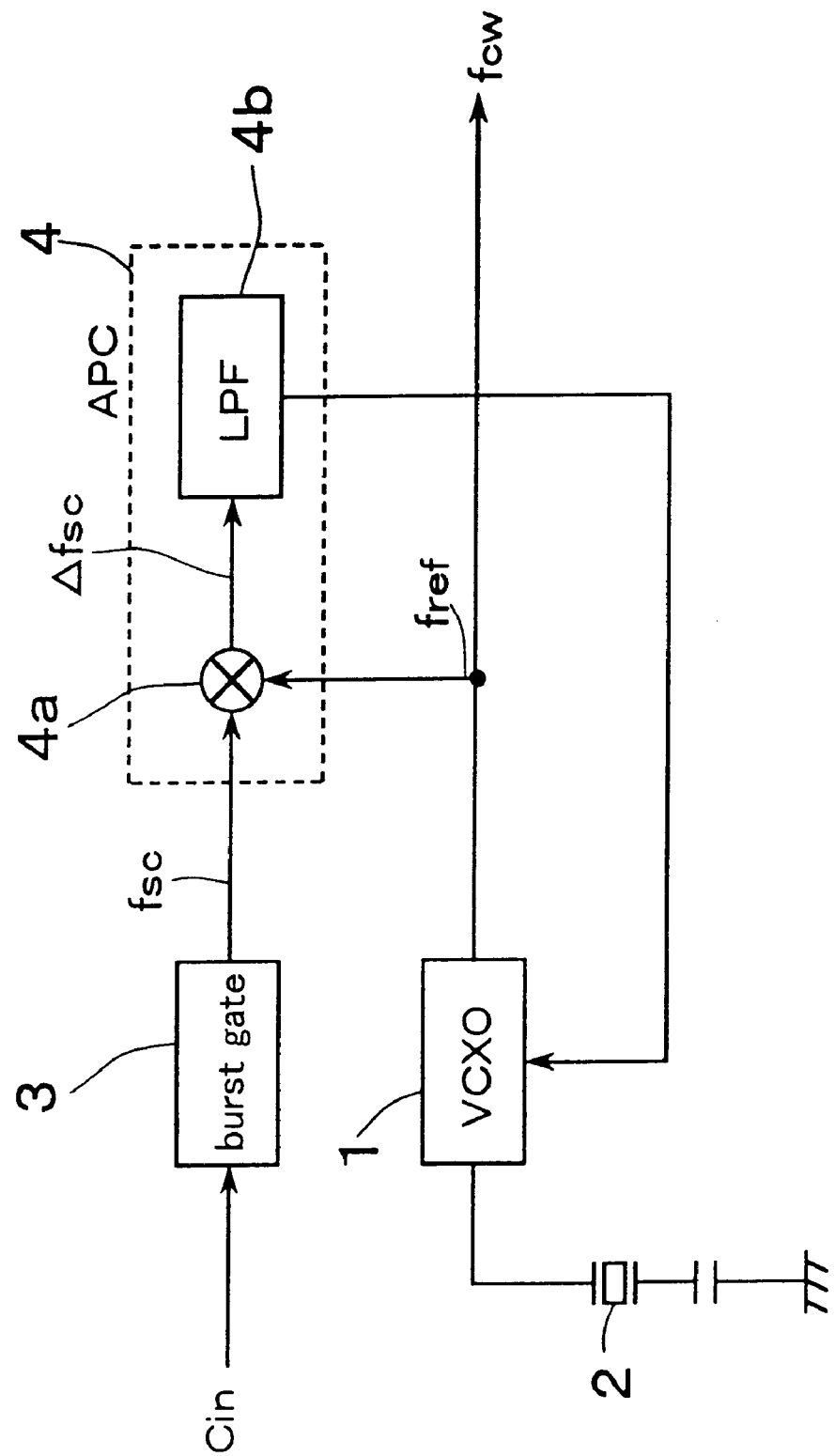
FIG. 8 is a block diagram of a conventional circuit for generating a reference carrier signal.

Also in this embodiment, when a burst signal of 4.433619 MHz (PAL format) is input, the output signal $f_{ref}$ of the first voltage-controlled oscillator 31 can be fed directly into the phase comparator 42a of the APC circuit 42. In a variant configuration shown in FIG. 7, three switches SW2–SW4 and two bypass lines 51 and 52 are added to the circuit in FIG. 4. When a burst signal of 4.433619 MHz is input, the switches SW2–SW4 switch to the opposite positions of the positions shown in FIG. 7. Thus, the output signal $f_{ref}$ of the first voltage-controlled oscillator 31 is fed directly through the bypass line 51 and the switch SW2 into the phase comparator 42a, and the output of the lowpass filter 42b is returned as feedback through the switch SW3 and the bypass line 52 to the control terminal of the first voltage-controlled oscillator 31. At the same time, the reference voltage source is disconnected from the control terminal of the voltage-controlled oscillator 31.

The values j and k for the frequency divider or the values m, n and p for the counter can be switched by usual method. For example, a circuit which provides with outputs corresponding to the combinations of the values are installed and switched in accordance with a required frequency, either automatically or manually. For the purpose of automatic switching, the circuit can be switched by a signal indicating a frequency of the input television signal. Such a frequency indicating signal can be obtained by using output signals of a plurality of color killer circuits which detect the existence of color signals of respective color systems. That is, the frequency of the input television signal can be determined in accordance with the combination of the color signals detected by the color killer circuit.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A circuit for generating a reference signal synchronized with a burst signal that is input into the circuit, the circuit comprising:
    a first and a second voltage-controlled oscillators having a control terminal, respectively, with oscillation frequencies being variable in response to signals supplied to the control terminals;
    a first frequency divider for dividing a frequency of an output signal of the first voltage-controlled oscillator by j;
    a second frequency divider for dividing a frequency of an output signal of the second voltage-controlled oscillator by k;
    a first phase comparator for comparing a phase of an output signal of the first frequency divider with a phase of an output signal of the second frequency divider;
    a first lowpass filter for smoothing an output signal of the first phase comparator and supplying the smoothed signal to the control terminal of the second voltage-controlled oscillator so as to form a feedback control path;
    a second phase comparator for comparing a phase of an output signal of the second voltage-controlled oscillator with a phase of the burst signal; and
    a second lowpass filter for smoothing an output signal of the second phase comparator and supplying the smoothed signal to a control terminal of the first voltage-controlled oscillator so as to form a feedback control path;
    wherein the reference signal is obtained from the output signal of the second voltage-controlled oscillator.

2. The circuit according to claim 1, wherein a variable range of oscillation frequency of the second voltage-controlled oscillator is broader than a range of frequencies obtained by multiplying the output frequency of the first voltage-controlled oscillator by k/j.

3. The circuit according to claim 1, further comprising means for activating the feedback from the second phase comparator to the first voltage-controlled oscillator only when the burst signal is active, and means for activating the feedback from the first phase comparator to the second voltage-controlled oscillator only when the burst signal is not active.

4. The circuit according to claim 1, wherein the feedback from the first phase comparator to the second voltage-controlled oscillator is only active for a predetermined period, and a duty ratio which is a ratio of the predetermined period to the other period is variable.

5. The circuit according to claim 1, further comprising a burst gate circuit for extracting the burst signal from a chrominance signal.

6. The circuit according to claim 1, further comprising
    a frequency multiplier for multiplying by α a frequency of the output signal of the first voltage-controlled oscillator; and
    a third frequency divider for dividing by α a frequency of the output signal of the second voltage-controlled oscillator;
    wherein the output signal of the first voltage-controlled oscillator passes through the frequency multiplier before being input into the first frequency divider; the output signal of the second voltage-controlled oscillator passes through the third frequency divider before being input into the second phase comparator; and the output signal of the second voltage-controlled oscillator is output as the reference signal.

7. The circuit according to claim 6, wherein a variable range of oscillation frequency of the second voltage-controlled oscillator is broader than a range of frequencies obtained by multiplying the output frequency of the first voltage-controlled oscillator by αk/j.

8. The circuit according to claim 6, wherein the value of α is 4;
    a center oscillation frequency of said first voltage-controlled oscillator is approximately 4.43 MHz;
    the divisors j and k for the first and the second frequency dividers are set in a manner that
        (i) when a frequency of the input burst signal is 3.575611 MHz, the divisors j and k are set to 186 and 150, respectively,
        (ii) when a frequency of the input burst signal is 3.579545 MHz, the divisors j and k are set to 218 and 176, respectively,
        (iii) when a frequency of the input burst signal is 3.582056 MHz, the divisors j and k are set to 177 and 143, respectively; and
    when a frequency of the input burst signal is 4.433619 MHz, the output signal of the first voltage-controlled oscillator is directly input into the second phase comparator.

9. The circuit according to claim 1, wherein
    the center oscillation frequency of the first voltage-controlled oscillator is approximately 17.7 MHz; and
    the divisors j and k for the first and the second frequency dividers are set in a manner that
        (i) when a frequency of the input burst signal is 3.575611 MHz, the divisors j and k are set to 186 and 150, respectively;
        (ii) when a frequency of the input burst signal is 3.579545 MHz, the divisors j and k are set to 218 and 176, respectively;
        (iii) when a frequency of the input burst signal is 3.582056 MHz, the divisors j and k are set to 177 and 143, respectively; and
        (iv) when a 4.433619 MHz burst signal is input, both divisors j and k are set to 200.

10. A circuit for generating a continuous reference signal with a frequency and a phase the same as a frequency and a phase of a burst signal that is input into the circuit, the circuit comprising:
    a first voltage-controlled oscillator using a quartz oscillator;
    a second voltage-controlled oscillator having a control terminal, with a oscillation frequency being variable in response to a signal supplied to the control terminal;
    a phase comparator for comparing a phase of an output signal of the second voltage-controlled oscillator with a phase of the burst signal; and
    a lowpass filter for smoothing an output signal of the phase comparator and supplying the smoothed signal to the control terminal of the second voltage-controlled oscillator so as to form a feedback control path;
    a first counter for timing a first time span corresponding to m times a period of an output signal of the first voltage-controlled oscillator;
    a second counter for timing a second time span corresponding to n times a period of the output signal of the second voltage-controlled oscillator;

a third counter for timing a third time span corresponding to p times a period of the output signal of the second voltage-controlled oscillator, the third time span being set to be longer than the second time span; and a control means for applying a voltage to a control terminal of the second voltage-controlled oscillator, wherein
  (i) an oscillation frequency of the second voltage-controlled oscillator is decreased if the second time span and the third time span are both shorter than the first time span,
  (ii) the oscillation frequency of the second voltage-controlled oscillator is increased if the second time span and the third time span are both longer than the first time span, and
  (iii) the oscillation frequency of the second voltage-controlled oscillator is maintained if the first time span falls between the second time span and the third time span, wherein the reference signal is obtained from the output signal of the second voltage-controlled oscillator.

11. The circuit according to claim 10, wherein the first counter outputs a first signal when finished timing m times the period of the output signal of the first voltage-controlled oscillator;

the second counter outputs a second signal when finished counting n pulses in the output signal of the second voltage-controlled oscillator;

the third counter outputs a third signal when finished counting p pulses in the output signal of the second voltage-controlled oscillator, p being larger than n;

the second counter and the third counter are reset by a signal that is obtained by slightly delaying the first signal; and the control means comprises (i) a first latch and a second latch for latching the second signal and the third signal, respectively, in response to the first signal, and (ii) a decoder for obtaining a signal by decoding the output signals from the first latch and the second latch, and superimposing the decoded signal on the input signal to the low pass filter.

12. The circuit according to claim 10, further comprising means for activating the feedback from the phase comparator to the second voltage-controlled oscillator only when the burst signal is active.

13. The circuit according to claim 10, further comprising a burst gate circuit for extracting the burst signal from a chrominance signal.

14. The circuit according to claim 10, further comprising a frequency divider for dividing by $\alpha$ a frequency of the output signal of the second voltage-controlled oscillator, wherein the output signal of the second voltage-controlled oscillator passes through the frequency divider before being input into the phase comparator and output as the reference signal.

15. The circuit according to claim 10, wherein the value of $\alpha$ is 4;

a center oscillation frequency of the first voltage-controlled oscillator is approximately 4.43 MHz;

the value of m is 2048;

the count factors n and p for the second and the third counters are set in a manner that
  (i) when a frequency of the input burst signal is 3.575611 MHz, the count factors n and p are set to 6610 and 6603, respectively,
  (ii) when a frequency of the input burst signal is 3.579545 MHz, the count factors n and p are set to 6617 and 6610, respectively, and
  (iii) when a frequency of the input burst signal is 3.582056 MHz, the count factors n and p are set to 6622 and 6616, respectively; and when a frequency of the input burst signal is 4.433619 MHz, the output signal of the first voltage-controlled oscillator is directly input into the second phase comparator.

* * * * *